United States Patent
Wurr et al.

[11] 3,953,087
[45] Apr. 27, 1976

[54] BEARING RING MOUNTING FOR ROTARY DRUM

[75] Inventors: Jürgen Wurr, Ennigerloh; Kurt Henning; Horst Bönisch, both of Neubeckum, all of Germany

[73] Assignee: Polysius AG, Neubeckum, Germany

[22] Filed: May 14, 1975

[21] Appl. No.: 577,183

[30] Foreign Application Priority Data
May 27, 1974 Germany...................... 7418334[U]

[52] U.S. Cl.................................. 308/22; 34/121
[51] Int. Cl.².................................... F16C 29/00
[58] Field of Search.................. 308/15, 22, 72, 73, 308/37; 34/121, 133, 139

[56] References Cited
UNITED STATES PATENTS
| 2,925,663 | 2/1960 | Smith | 308/22 X |
| 3,704,921 | 12/1972 | Skytta | 308/22 |

*Primary Examiner*—M. H. Wood, Jr.
*Assistant Examiner*—Gene A. Church
*Attorney, Agent, or Firm*—Learman & McCulloch

[57] ABSTRACT

This invention relates to a rotary drum having a bearing ring mounted on the drum casing and movable relative thereto in the peripheral direction, said ring being supported by support plates affixed to the drum casing at constant intervals.

6 Claims, 3 Drawing Figures

BEARING RING MOUNTING FOR ROTARY DRUM

The rotary drum concerned may be a rotary kiln, cooling drum, drying drum or other rotary drum. A movable bearing ring located on the drum casing, and known as a loose bearing ring, lags behind the rotary motion of the drum casing while the drum is operating, and hence "wanders" on the drum casing. In the disposition of a loose bearing ring on the drum casing, in practice difficulties frequently arise as regards effective mounting and reliable holding of the bearing ring on the support plates.

The invention is therefore based on the problem of providing a rotary drum of the type initially described, which in particular ensures effective mounting and reliable holding of the (loose) bearing ring.

According to the invention this problem is solved in that at both of the axial end faces of the bearing ring there is provided a limiting ring, also supported on the support plates, and substantially fixed in its retaining position. These two limiting rings ensure good axial support for the bearing ring so that this is fixed axially of the rotary drum during its movement relative to the rotary drum casing. The limiting rings can be affixed to the support plates which carry the bearing ring without difficulty and by relatively simple means, and this fixing can be adapted according to the particular usage of the rotary drum.

If for instance hot material being treated is to be passed through the rotary drum, it will be desirable for the limiting rings to be mounted on the support plates with a predetermined play, as with the bearing ring, the limiting ring then fixed in place by retaining elements applied to the limiting ring itself and/or to at least some of the support plates.

At positions where very little or no thermal expansions are expected, the lateral limiting rings can be welded directly to at least one support plate, which produces a very simple construction.

The invention will be described in more detail below with reference to the embodiment shown in the drawings, wherein.

Figure 1:
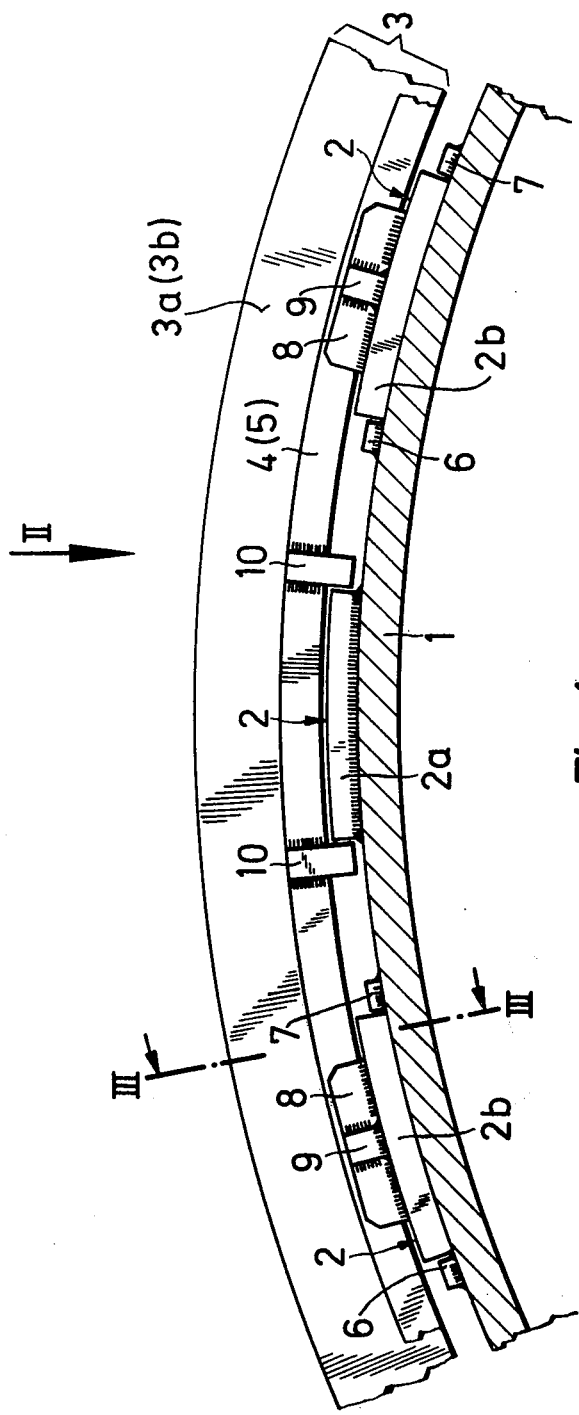
FIG. 1 is a partial cross-section through a rotary drum in accordance with the invention.

The rotary drum, of which only a part is shown in cross-section in FIG. 1, comprises a drum casing 1 to whose periphery a number of support plates 2 are welded at constant intervals. Support plates 2 carry with predetermined play what is called a loose bearing ring 3 which is relatively movable circumferentially of the rotary drum. At each of the axial end faces 3a, 3b there is disposed a closed limiting ring 4, 5, which is also supported by the support plate 2; in this case both limiting rings 4, 5 are of square cross-section, wherein as clearly seen from FIG. 3 this cross-section is considerably smaller than that of the bearing ring 3. Since the rotary drum is intended for example for the heat-treatment of material, the lateral limiting rings 4, 5 like the bearing ring 3 are applied substantially loosely, as will be explained below, on the support plates 2 with a predetermined slight play, and are then substantially fixed in their retaining position.

The individual support plates are made with a curve in the peripheral direction to match the rotary drum casing 1, and have a radius of curvature which is slightly less than the outer radius of curvature of the rotary drum casing 1. In this manner the stretching of the support plates caused by operation and welding is compensated, and the support plates lie flush against the outer periphery of the drum casing 1.

Figure 2:
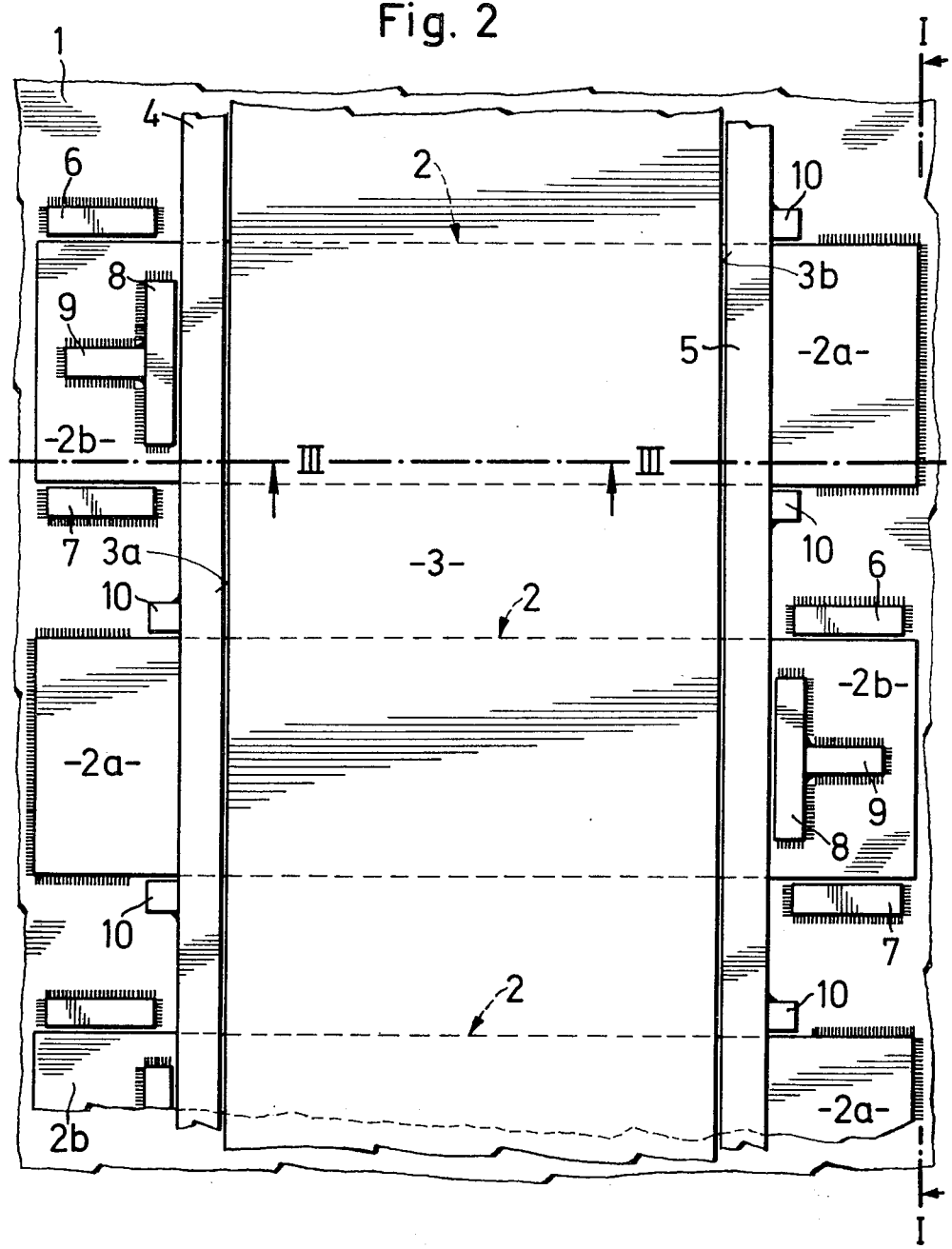
FIG. 2 is a partial plan view of the rotary drum casing in the area of the bearing ring.
Figure 3:
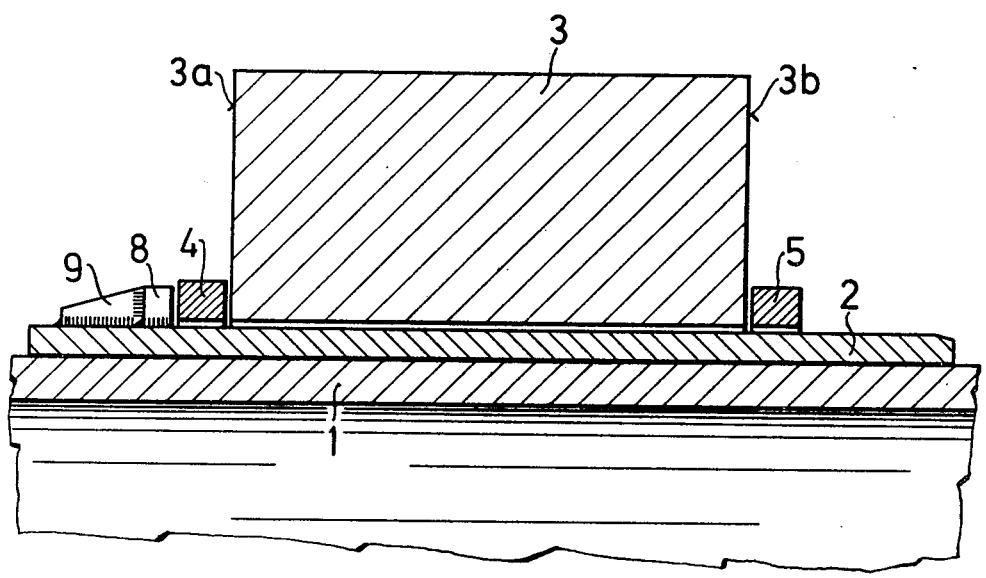
FIG. 3 is a cross-section on the line III—III in FIG. 2.

As may be seen especially from FIGS. 2 and 3, each support plate 2 is made long enough to project beyond the width of the bearing ring 3 on both sides of the ring, and beyond the lateral limiting rings 4, 5. Each support plate 2 is only welded to the rotary drum casing at one of the plate ends 2a projecting beyond the bearing ring and the limiting rings, while the plate end 2b projecting on the opposite side of the bearing ring 3 lies loosely on the periphery of the drum casing 1. At each of the two sides directed in the direction of the drum periphery of this end 2b of the support plate 2 which lies loosely against the drum casing 1 a guide block 6, 7 is affixed to the drum casing, preferably by welding. These guide blocks 6, 7 provide stabilization of the support plate 2 at this loose end; when suitably shaped they also prevent any bending of the plates away from the drum casing caused by movement of the bearing ring.

The attachment of the individual support plates 2 is effected by these plates 2 adjacent to each other in the peripheral direction of the rotary drum each being welded to the drum casing on opposite sides of the bearing ring 3 (see especially FIG. 2). With this feature one can accommodate different thermal extensions in the drum casing 1 and in the support plates 2.

In order to permit fixing of the limiting rings 4, 5, loosely supported by the support plates 2, in their position for retaining the bearing ring 3, fixing elements are fastened both to the limiting rings themselves and also to the support plates 2. In order to stabilize the limiting rings 4, 5 in the axial direction, reinforcement or abutment plates 8, 9 are welded on to the loose ends 2b of the support plates 2 to act as axial abutment elements loosely in contact with the corresponding limiting ring, against one lateral face thereof. As may be seen from FIGS. 2 and 3, on each loose end 2b of the support plate 2 there is welded a guide or abutment plate 8 extending generally in the circumferential direction parallel to the limiting ring 4, 5, plate 8 being of about the same height as the limiting ring; this abutment plate 8 is backed up by the reinforcement plate 9 which runs generally axially of the drum casing. This disposition of the plates 8, 9 produces particularly robust support and guidance of the limiting rings 4, 5 in the axial direction. With smaller or less heavily stressed rotary drums however one reinforcement plate can be sufficient.

To provide loose fixing of the limiting rings 4, 5 on the rotary drum casing 1 and the support plates 2 a lug 10 extending generally perpendicular to the drum casing 1 is welded to the corresponding limiting ring 4, 5 on both the sides facing in the peripheral direction of the drum on the welded-on ends 2a of each support plate 2; this lug is slightly spaced both from the drum casing 1 and from the corresponding edge of the support plate 2 (see FIG. 2) and can abut the plate 2 to circumferentially restrain rings 4, 5.

As will be clear from the preceding description, the plates 8, 9 and the lugs 10 are disposed alternately at both lateral faces 3a, 3b of the bearing ring 3 to correspond with the welded-on and loose ends 2a and 2b of the support plates 2.

Variations and modifications of the embodiment described above are obviously possible within the scope of the invention. Thus for instance in cases wherein the operating conditions, especially the temperatures involved, so permit, the lateral limiting rings can be welded directly and without predetermined play to the alternate loose ends 2b of the support plates 2.

What is claimed is:

1. In a rotary drum having a bearing ring loosely mounted upon the drum periphery for circumferential movement relative to the drum; the improvement comprising a plurality of axially extending support plates mounted on said drum in underlying relationship to said bearing ring, and a pair of limiting rings mounted on said support plates at the axially opposite sides of said bearing ring to restrict axial movement of said bearing ring relative to said drum while accommodating circumferential movement of said bearing ring relative to said drum.

2. The invention defined in claim 1 further comprising axial and circumferential abutment means interengageable between said limiting rings and said support plates accommodating a limited amount of axial and circumferential play between said limiting rings and said support plates.

3. The invention defined in claim 2 wherein the opposite axial ends of said support plates project axially beyond said limiting rings, means fixedly securing one axial end only of each support plate to said drum, with adjacent support plates being respectively secured by their axially opposite ends to said drum, said axial abutment means being located on the end of the support plate remote from the end secured to said drum.

4. The invention defined in claim 3 wherein said circumferential abutment means comprises a pair of lugs fixedly secured to said limiting ring, said lugs being circumferentially spaced from each other by a distance slightly exceeding the circumferential extent of a support plate and being engageable with the opposite sides of the support plate.

5. The invention defined in claim 3 further comprising a pair of guide blocks mounted on said drum adjacent opposite circumferential sides of each support plate adjacent that end of the support remote from its secured end.

6. The invention defined in claim 1 wherein the support plates are curved with a radius of curvature slightly smaller than that of the drum periphery.

* * * * *